Figure 1:
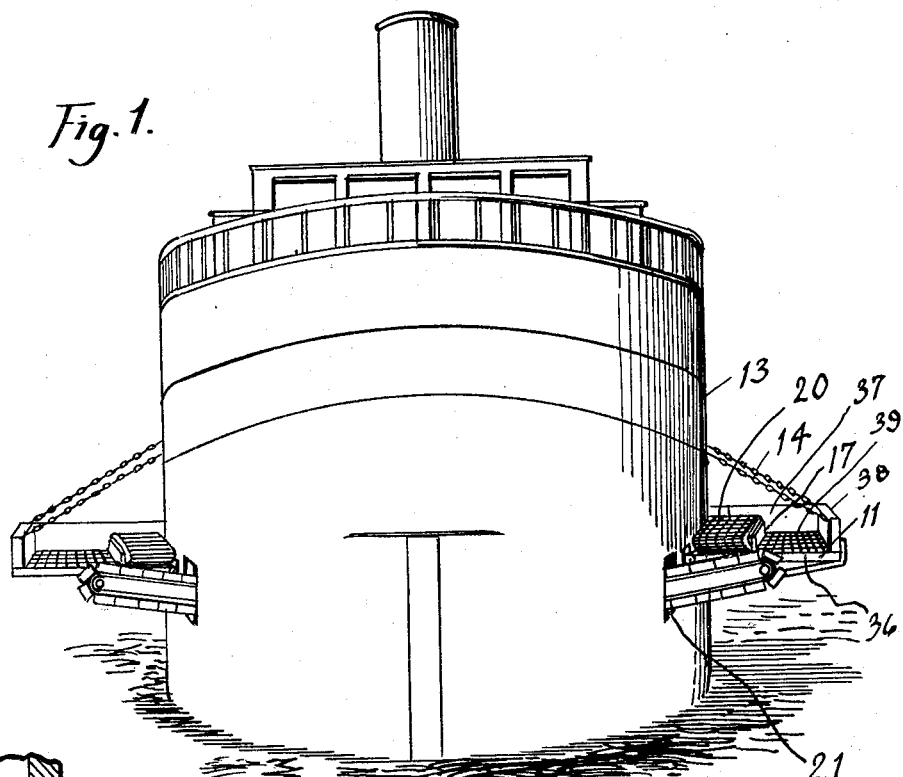

Jan. 17, 1933.   H. SHIRAISHI ET AL   1,894,428
FISHING BRIDGE
Original Filed Dec. 1, 1930   2 Sheets-Sheet 1

INVENTORS:
HIKOKUMA SHIRAISHI.
WILLIAM S. O'HIRA.
BY ATTY:

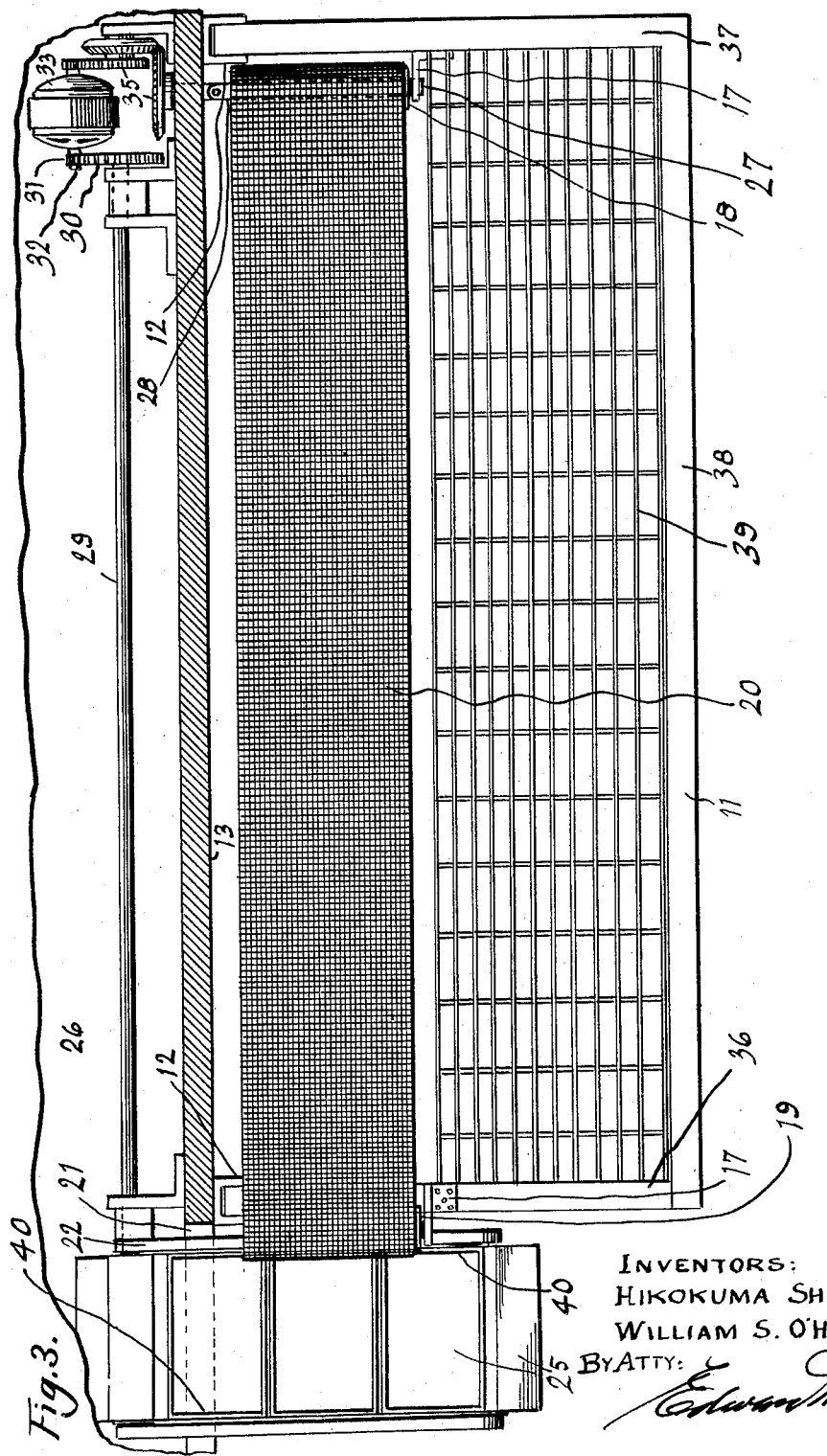

Patented Jan. 17, 1933

1,894,428

UNITED STATES PATENT OFFICE

HIKOKUMA SHIRAISHI, OF WILMINGTON, AND WILLIAM S. O'HIRA, OF TERMINAL ISLAND, CALIFORNIA

FISHING BRIDGE

Application filed December 1, 1930, Serial No. 499,246. Renewed May 16, 1932.

This invention relates to a device for use on large ocean vessels and steamships, and for use in fishing therefrom with pole, hook and line.

Its objects are to facilitate the taking of fish with pole and line from large steamers and ocean vessels, to provide for the manner of fishing hereinafter set forth in detail, to provide a foldable fishing bridge which may be turned up against the side of a ship or vessel when not in use, to provide a fishing bridge adjacent to the surface of and above the sea, to provide conveyors operative to carry the fish, as soon as caught, into a cold storage chamber within the ship, and to provide means for actuating the conveyors and for placing the bridge in its inoperative position.

Fishing boats, adapted for the taking of fish from the sea with hook and line, are usually low, and are not well adapted for sailing in high seas, and it is difficult and inconvenient to fish from the deck of a large boat or steam ship owing to the distance between the deck and the sea.

To avoid these objections and to accomplish the objects of the invention, we mount supporting platforms or bridges on each or either side of a ship or vessel, adjacent to the stern thereof, and means for supporting the bridge at a suitable fishing distance above the surface of the sea.

Fish, if not cared for soon after being caught, will soon spoil and become unfit for food. To avoid this objection, we provide an endless conveyor traveling along the rear of the bridge and means for actuating the conveyor whereby the fish, as caught, are carried to one end of the conveyor where they are dumped onto another conveyor which carries them into the interior of the ship and into a cold storage room thereof, thereby preventing any decomposing of the fish.

The fishing bridge we provide, affords means for fishing from large ocean-going ships and vessels, and, when not in use, may be placed in collapsed position. The second conveyor, which extends from the cold storage chamber to the exterior, may be withdrawn within the ship, allowing the hole therefor to be closed.

The drawings illustrate an embodiment of the invention which we have so far found to be the most practical to use for the purpose intended, and whereby large sea fish may be caught and properly cared for, from large boats and sea vessels, such as are adapted for long sea voyages. The device is susceptible of various changes, alterations and modifications without departing from the spirit of the invention, and we therefore do not wish to be limited to the precise details of construction exhibited in the drawings, but reserve the right to minor changes that may fall within the scope of the appended claims.

Figure 2:
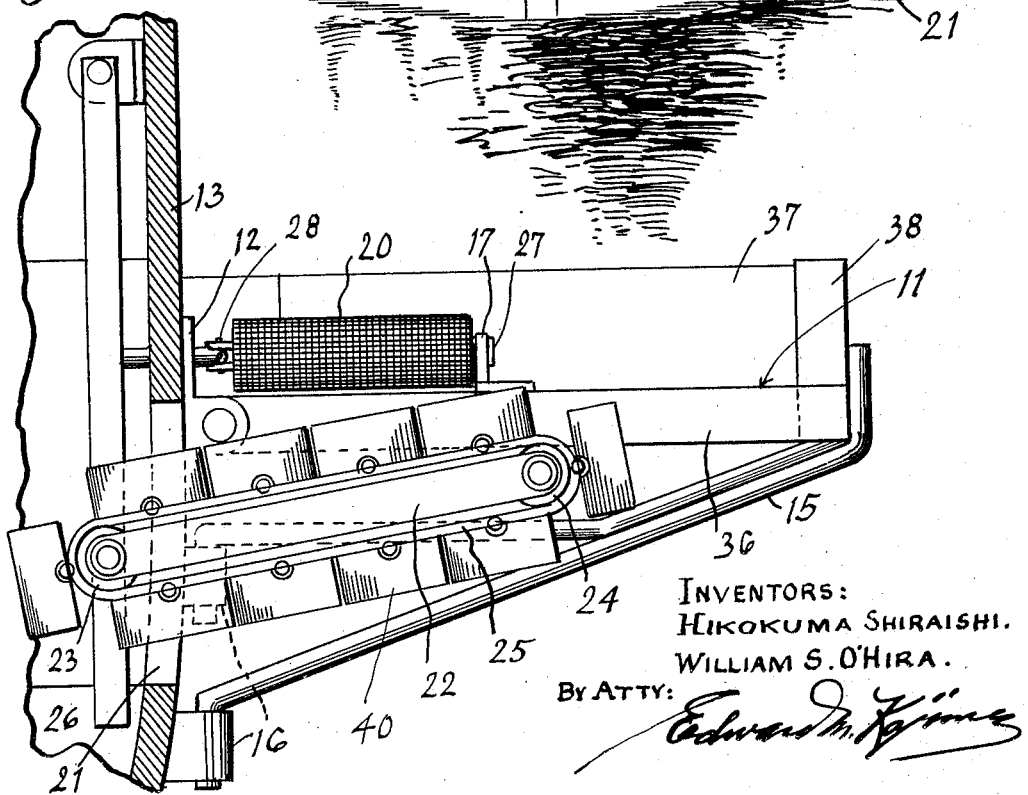

In the drawings: Figure 1 is a front elevation of a ship, showing a fishing bridge supported on one side thereof and in operative position. Fig. 2 is an enlarged end elevation of the fishing bridge. Fig. 3 is a top plan view thereof.

Referring in detail to the drawings, our improved fishing bridge consists of a platform 11, having hinged connection with brackets 12 on the side of ship 13, and adapted to fold upwardly by means of chains 14, against the side of the ship. In its operative position, platform 11 is supported by iron brackets 15, mounted in sockets 16 on the side of the ship, the brackets 15 swinging inwardly and against the side of the ship in their inoperative position. In operative position, the chains 14 lie loosely on the platform and do not interfere with the fishing.

In brackets 17, disposed on platform 11, the rollers 18 and 19 are journalled. An endless belt conveyor 20, made preferably of heavy fabric belting, is mounted on rollers 18 and 19. This conveyor travels at the rear of the platform. Through port 21, in the side of the ship, a frame 22 projects, carrying rollers 23 and 24, on which is mounted an endless conveyor 25, which is adapted to receive the fish from conveyor 20, and to carry them into a cold storage chamber 26, within the ship. Roller 18 has a shaft 27, provided with a universal joint 28, and extending into the interior of the ship. Roller 23 has a shaft 29, carrying a pinion gear 30 in mesh with a gear wheel 31, on shaft 32, which, through gears 33 is driven by motor 34. Shaft 27, through a train of gears 35, is driven by motor 34. Both conveyors, through the speed reducing gears, are driven at suitable speed to carry the fish into the cold storage chamber.

The fishing platform 11 consists of a frame having side members 36 and 37, and an outer frame member 38, the frame members 37 and 38 extending upwardly a sufficient height to engage with and constitute a brace for the fisherman's knees, and thereby facilitate the handling of large fish. Platform 11 has a bottom 39, preferably of iron grating. We provide conveyor 25 with side guards 40, so that the fish, when falling from the first conveyor, will be retained on the second conveyor.

From the foregoing description and drawings, it may be seen that we have provided an efficient fishing bridge adapted to be supported on the side of a large boat or ship, to be supported at a suitable distance above the sea surface whereby fish may be readily caught with a hook and line, and adapted to be collapsed to inoperative position to allow for cruising on the high seas.

It may be further seen that we have provided means for quickly transferring the fish, as caught, into cold storage chambers within the ship, thereby avoiding decomposition of the fish, and thereby preserving the same for food.

It may be seen that we have provided means whereby large boats and ocean-going vessels may be adapted for fishing purposes, and whereby the fishing may be as expeditiously done as with a small fishing boat.

Only two fishing bridges are illustrated in the drawings, but a large ship may be provided with as many as desired, and they may be of any length as desired.

We claim:

1. A fishing bridge, comprising a platform adapted to be mounted on the side of a ship and at suitable fishing distance above the sea surface, a knee rail extending upwardly from the platform and around the edges thereof, and conveyor elements leading from the platform and into the interior of the ship.

2. A fishing bridge, comprising a platform adapted to be mounted on the side of a ship and at suitable fishing distance above the sea surface, a knee rail extending upwardly from the platform and around the edges thereof, an endless conveyor disposed at the rear of the platform and adapted to receive the fish as caught, and another endless conveyor disposed adjacent to the platform and extending into the ship and arranged to receive the fish from the first-named conveyor.

3. A fishing bridge, comprising a platform hingedly connected relative to the side of a ship and at suitable fishing distance above the sea surface, means for folding the platform to an inoperative collapsed position, rollers mounted on each end of the platform, an endless conveyor traveling on the rollers and adapted to carry the fish as caught to one end of the platform, a frame extending through a port in the side of the ship, other rollers carried by said extending frame, an endless conveyor traveling on the last named rollers, and adapted to receive the fish from the first-named conveyor, and means for actuating the said rollers with rotary movement.

4. A fishing bridge, comprising a foldable collapsible platform mounted on the side of a ship, and adjacent to a port therein, a conveyor disposed at the rear of the platform and longitudinally thereof and adapted for carrying the caught fish to one end thereof, and an additional conveyor adapted to receive the fish from the first-named conveyor and to carry the fish through said port and into the interior of the ship.

5. A fishing bridge, comprising a foldable collapsible platform mounted on one side of a ship and adjacent to a port therein, a conveyor disposed at the rear of the platform to carry the fish to one end thereof, and an additional conveyor traveling through said port, and adapted to receive the fish from the first-named conveyor, and means for actuating the conveyors synchronously.

6. A fishing bridge, comprising a foldable collapsible platform mounted on the side of a ship and adjacent to a port therein, a knee rail extending upwardly from and around the outer edges of the platform, a conveyor disposed at the rear of the platform and longitudinally thereof, and adapted to carry the fish to one end of the platform, a conveyor extending through said port and adapted to receive the fish from the first-named conveyor, and means for actuating the conveyors continuously with a traveling movement.

7. A fishing bridge, comprising a platform disposed on the side of a ship and adjacent to the sea surface, and cooperative conveying means disposed on and adjacent to the platform for carrying the fish therefrom and into the ship.

8. The combination with a platform mounted on the side of a ship, and brackets supporting the platform in open position, of two conveyors, one disposed at the rear of the platform to carry the fish to one end thereof, and the other disposed at the end of the platform and to receive the fish from the first-named conveyor and carry them into the interior of the ship.

9. The combination with a platform foldable against the side of a ship, and brackets adapted to support the platform in open position, of two conveyors, one disposed to carry the caught fish along the rear portion of the platform, and the other disposed to carry the fish into the ship, and disposed at one end of the platform.

10. In a fishing bridge, the combination with a platform supported at the side of a ship and convenient fishing distance above the surface of the sea, and mechanical elements arranged for carrying the caught fish from the platform and into the ship.

11. In a fishing bridge, the combination with a platform supported at the side of a ship and at suitable fishing distance above the surface of the sea, and adjacent to a port in the side of the ship, of conveying elements disposed along the rear of the platform and other conveying elements leading from the platform and into the ship, and extending through the said port, and means for actuating the conveying elements.

12. In a fishing bridge, a platform disposed at the side of a ship and at suitable fishing distance above the surface of the sea, and cooperative conveying elements disposed along the platform and extending into the ship, and serving to carry the caught fish into the ship.

13. In a fishing bridge, a platform disposed at the side of a ship and at suitable fishing distance above the surface of the sea, and adjacent to a port in the side of the ship, and means for transporting the caught fish from the platform and into the ship and through the port therein.

In testimony whereof, we hereunto affix our signatures.

HIKOKUMA SHIRAISHI.
WILLIAM S. O'HIRA.